(12) United States Patent
Craske et al.

(10) Patent No.: US 9,430,421 B2
(45) Date of Patent: Aug. 30, 2016

(54) INTERRUPT SIGNAL ARBITRATION

(71) Applicant: ARM Limited, Cambridge (GB)

(72) Inventors: Simon John Craske, Cambridge (GB); Michael Alexander Kennedy, Cambridge (GB); Andrew John Turner, Cambridge (GB); Richard Anthony Lane, Cambridge (GB)

(73) Assignee: ARM Limited, Cambridge (GB)

( * ) Notice: Subject to any disclaimer, the term of this patent is extended or adjusted under 35 U.S.C. 154(b) by 363 days.

(21) Appl. No.: 14/206,236

(22) Filed: Mar. 12, 2014

(65) Prior Publication Data

US 2015/0261700 A1  Sep. 17, 2015

(51) Int. Cl.
*G06F 13/26* (2006.01)
*G06F 13/38* (2006.01)

(52) U.S. Cl.
CPC ................................. *G06F 13/26* (2013.01)

(58) Field of Classification Search
None
See application file for complete search history.

(56) References Cited

U.S. PATENT DOCUMENTS

2009/0319709 A1* 12/2009 Vallius .............. H04L 12/40006
710/118
2014/0047149 A1*  2/2014 Marietta ................. G06F 13/26
710/264

OTHER PUBLICATIONS

Intel, "Intel® 64 and IA-32 Architectures Software Developer's Manual" vol. 3 (3a, 3B & 3C) System Programming Guide, Sep. 2013, Section 10.8.3, 5 pages.
Texas Instruments, KeyStone Architecture Chip Interrupt Controller (CIC) User Guide, Mar. 2012, 35 pages.
Freescale Semiconductor, "MPC5567 Microcontroller Reference Manual" Section 10.4.2.1.1, Apr. 2012, 3 pages.
Renesas, "V850E2/Px4 Renesas microcomputers V850 Series User's Manual: Hardware" Section 4.5.2, Mar. 2013, 7 pages.
Renesas, "Renesas 32-Bit RISC Microcomputer SuperH™ RISC engine Family Software Manual", Section 3.6.2, Jul. 2005, 3 pages.

* cited by examiner

*Primary Examiner* — Scott Sun
(74) *Attorney, Agent, or Firm* — Nixon & Vanderhye P.C.

(57) ABSTRACT

An interrupt controller includes a priority level arbitrator (8) including multiple stages. The stages include at least one stage comprising a plurality of interrupt selectors formed of a multiplexer (14) for selecting between a pair of potentially concurrently asserted interrupt signals in dependence upon selection data. The selection data is determined in advance by a priority level comparator (12) using priority level data associated with the respective interrupt signals.

12 Claims, 5 Drawing Sheets

INTERRUPT SIGNAL ARBITRATION

BACKGROUND OF THE INVENTION

1. Field of the Invention

This disclosure relates to the field of data processing systems. More particularly, this disclosure relates to the arbitration of priority levels between interrupt signals.

2. Description of the Prior Art

It is known to provide data processing systems with interrupt controllers responsive to multiple interrupt signals each having an associated priority level. Arbitration mechanisms are provided such that when more than one interrupt signal is asserted at a given time, then the highest priority interrupt signal may be identified and used to trigger its associated interrupt processing ahead of the one or more pending interrupts having a lower priority value.

The priority levels associated with different interrupt signals may be fine-grained and potentially programmable. The priority levels may be represented by multi-bit numbers which are compared during arbitration in order to determine which priority level is highest. The arbitration between priority levels should be performed quickly in order to reduce interrupt latency. Interrupt latency is an important performance parameter, particularly in real time processing systems. Accordingly, the comparison of priority levels may be performed in hardware and with multiple comparisons being performed in parallel.

SUMMARY OF THE INVENTION

Viewed from one aspect the present disclosure provides an apparatus for processing data comprising:

an interrupt signal receiver configured to receive a plurality of interrupt signals having respective priority levels; and a priority level arbitrator coupled to said interrupt signal receiver and configured to identify an interrupt signal having a highest priority level among interrupt signals concurrently asserted at a given time; wherein said priority level arbitrator comprises:

i) a priority level comparator configured to generate selection data by comparing priority levels within each of a plurality of sets of interrupt signals from within said plurality of interrupt signals, said selection data representing an intra-set priority level ordering of said interrupt signals within each of said plurality of sets determined independently of assertion of any of said plurality of interrupt signals;

(ii) a plurality of interrupt selectors, each of said plurality of interrupt selectors having a corresponding set within said plurality of sets and programmed with a corresponding portion of said selection data to select from among any concurrently asserted interrupt signals within said corresponding set an interrupt signal having a highest priority among said concurrently asserted interrupt signals within said corresponding set.

The present technique recognizes that in practice the priority levels associated with different interrupt signals change relatively infrequently and accordingly selection data may be determined in advance which can be used to identify within sets of the interrupt signals which of those interrupt signals has the highest priority level in advance of those interrupt signals being asserted. When this selection data has been established, then at least some of the comparisons which the selection data specifies may be avoided as those comparisons have effectively been performed in advance and encoded within the selection data. Thus, the hardware overhead associated with the priority level arbitrator may be, in at least some embodiments, reduced.

While it is possible that the sets of interrupt signals can have a variety of different sizes, the complexity of the interrupt selectors increases as the number of members of the sets increase. In some embodiments the sets comprise two interrupt signals and the selection data specifies which of these two interrupt signals has the highest priority level and should be selected if both are asserted concurrently. If only one of the interrupt signals is asserted, then it will be appreciated that the asserted signal will be selected by the interrupt selector and that if none of the interrupts within the set are asserted, then none will be selected as a candidate for a highest priority pending interrupt (HPPI) which is to be identified by the priority level arbitrator.

One form of interrupt selector comprises a multiplexer steered by a corresponding portion of the selection data which specifies which of the interrupt signals for the set of interrupt signals associated with that interrupt selector has the highest priority if multiple interrupt signals are concurrently asserted within that set.

It will be appreciated that the priority levels may in some embodiments be dynamic (e.g. software updatable) and accordingly the priority level comparator may be configured to update at least a portion of the selection data when any of the priority levels of the plurality of interrupt signals are changed.

The amount of hardware required to perform the arbitration between concurrently asserted interrupt signals may be reduced if the plurality of sets into which the interrupt signals are divided comprise disjoint sets (i.e. no overlapping members).

One type of implementation for the priority level arbitrator is to have a multi-stage structure with each stage connected in series with at least one adjacent stage and selecting between concurrently asserted interrupt signals until a final stage identifies the asserted interrupt having the highest priority level among interrupt signals concurrently asserted at the given time (i.e. the highest priority pending interrypt known as the HPPI).

Within the context of such multi-stage arbitrators, the present techniques may be used to form a first stage within the structure as the complexity of the hardware required to use the present techniques within the first stage is relatively low as the number of potential input signals and associated priority levels is relatively low compared with subsequent stages within the multi-stage structure. Accordingly, subsequent stages following the first stage may dynamically compare priority levels of asserted interrupt signals between which a selection has been made rather than relying upon selection data which has performed such comparisons in advance and encoded the results within the selection data.

The interrupt signal receiver and the priority level arbitrator may be formed as part of an interrupt controller. Such interrupt controllers may be separately formed and used with a variety of different processing circuitry to which they are to provide an interrupt signal for which arbitration and selection has been previously performed. Such interrupt controllers may be considered as separate entities in their own right.

Viewed from another aspect the present disclosure provides an apparatus for processing data comprising:

interrupt signal receiving means for receiving a plurality of interrupt signals having respective priority levels; and priority level arbitrating means, coupled to said interrupt signal receiving means, for identifying an interrupt signal having a highest priority level among interrupt signals concurrently asserted at a given time; wherein
  said priority level arbitrating means comprises:
  (i) priority level comparing means for generating selection data by comparing priority levels within each of a plurality of sets of interrupt signals from within said plurality of interrupt signals, said selection data representing an intra-set priority level ordering of said interrupt signals within each of said plurality of sets determined independently of assertion of any of said plurality of interrupt signals;
  (ii) a plurality of interrupt selecting means for selecting an asserted interrupt signal, each of said plurality of interrupt selecting means having a corresponding set within said plurality of sets and programmed with a corresponding portion of said selection data to select from among any concurrently asserted interrupt signals within said corresponding set an interrupt signal having a highest priority among said concurrently asserted interrupt signals within said corresponding set.

Viewed from a further aspect the present disclosure provides a method identifying an interrupt signal having a highest priority level among a plurality of interrupt signals, said method comprising the steps of:
  generating selection data by comparing priority levels within each of a plurality of sets of interrupt signals from within said plurality of interrupt signals, said selection data representing an intra-set priority level ordering of said interrupt signals within each of said plurality of sets determined independently of assertion of any of said plurality of interrupt signals; and performing a plurality of selections, each of said plurality of selections having a corresponding set within said plurality of sets and programmed with a corresponding portion of said selection data generated in said generating step so as to select from among any concurrently asserted interrupt signals within said corresponding set an interrupt signal having a highest priority among said concurrently asserted interrupt signals within said corresponding set.

The above, and other objects, features and advantages of this disclosure will be apparent from the following detailed description of illustrative embodiments which is to be read in connection with the accompanying drawings.

DESCRIPTION OF THE EMBODIMENTS

Figure 1:
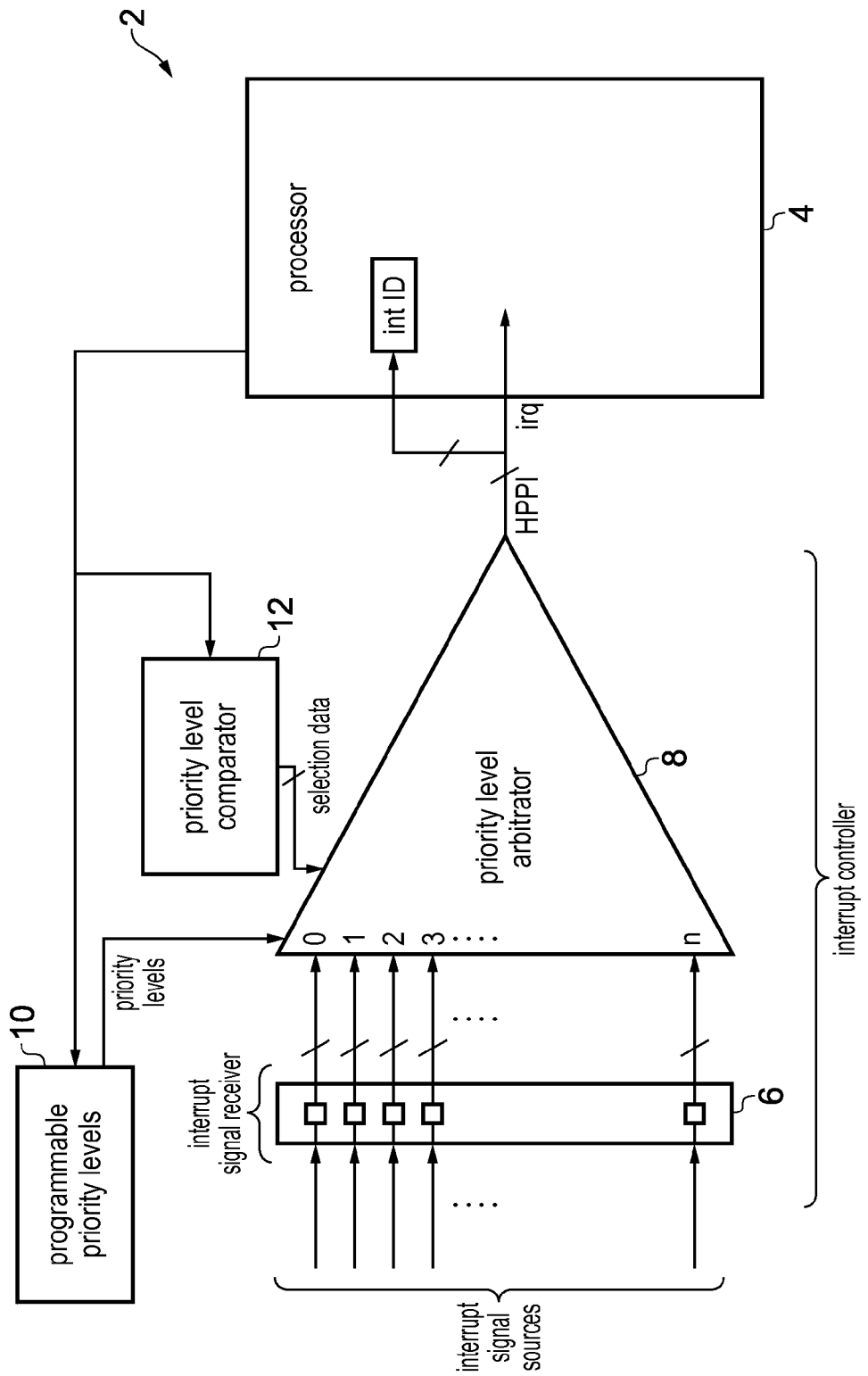
FIG. 1 schematically illustrates a data processing system including an interrupt controller.

FIG. 1 schematically illustrates a data processing system 2 including an interrupt controller and a processor 4, such as a general purpose processor executing program instructions. The interrupt controller includes an interrupt signal receiver 6 and a priority level arbitrator 8. The interrupt signal receiver 6 serves to receive a plurality of interrupt signals. Multiple of these interrupt signals may be concurrently asserted (i.e. indicate a pending interrupt for periods of time which at least partially overlap). Priority levels are associated with each of the interrupt signals and are stored within a programmable priority level store 10. The programmable priority levels associated with each interrupt are supplied to the priority level arbitrator 8 together with the interrupt signal signaling that an interrupt is pending for the interrupt number concerned.

The priority level arbitrator 8 serves to compare the priority levels of all of the concurrently pending interrupt signals (e.g. those not yet acknowledged and awaiting arbitration) and generates an output indicative of the priority level and interrupt identifier for the highest priority pending interrupt (HPPI). This output is supplied to the processor 4 and serves to trigger interrupt processing within the processor 4. The processor 4 may read the interrupt identifier generated as part of the HPPI signal to control which interrupt service routine is executed or to modify the behavior of that interrupt service routine as appropriate.

As will be appreciated by those in this technical field, the normal processing of the processor 4 may have a priority level associated with it and the interrupts supplied to the processor 4 may or may not have a higher priority level. Accordingly, masking may be applied to the interrupts received by the interrupt signal receiver 6 before they are passed to the priority level arbitrator 8, such that interrupts which do not have a priority level higher than that of the currently executing process on the processor 4 will not be passed forward to the priority level arbitrator 8 and accordingly will not generate an interrupt to the processor 4. Such masking circuitry has not been illustrated in FIG. 1 for the sake of clarity.

A priority level comparator 12 serves to receive the programmable priority levels which are generated under software control by the processor 4 and uses these to generate selection data which is then supplied to the priority level arbitrator 8 to control at least part of the arbitration operations of the priority level arbitrator 8. Whenever the programmable priority levels are updated, the priority level comparator 12 will update the appropriate portion of the selection data to reflect the updated priority levels which have been formed.

Figure 2:
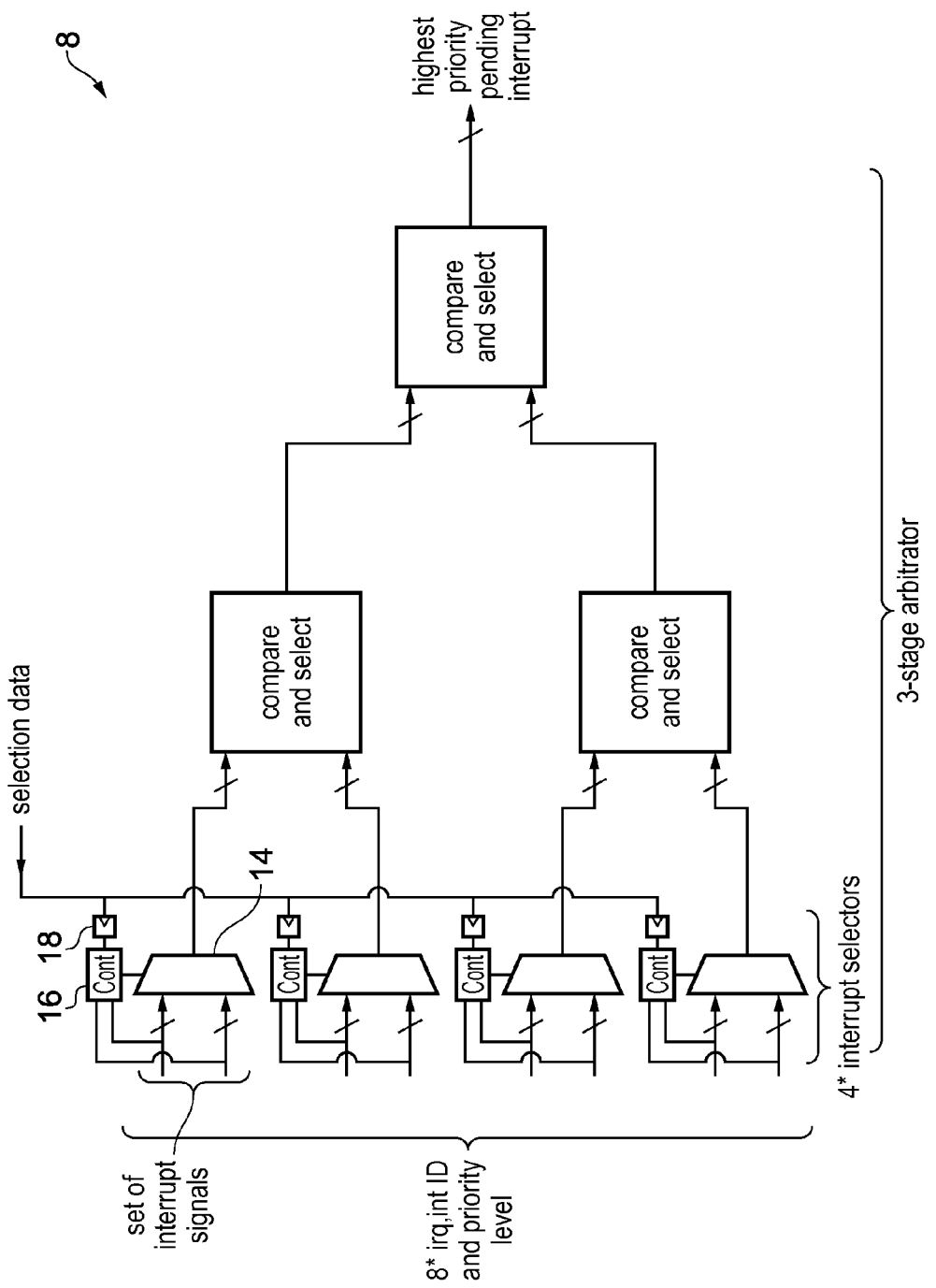
FIG. 2 schematically illustrates a multi-stage priority level arbitrator.

FIG. 2 schematically illustrates the priority level arbitrator 8 in more detail. In particular, the priority level arbitrator 8 comprises a multi-stage arbitrator, in this example having three stages. The stages are connected in series to at least one adjacent stage and each stage serves to select between concurrently asserted interrupt signals until the final stage identifies the HPPI.

As illustrated in FIG. 2, the first stage in the priority level arbitrator 8 comprises a plurality of interrupt selectors each including a multiplexer 14, a controller 16 and a selection data latch 18. The plurality of interrupt signals between which the priority level arbitrator 8 performs arbitration is, in the example of FIG. 2, limited to eight interrupt signals. It will be appreciated that in real life systems this number may be much higher. The plurality of interrupt signals is divided into disjoint sets of interrupt signals. In this example the disjoint sets each include two interrupt signals. The multiplexer 14 serves to select which, if any, of the interrupt signals within its associated set is passed to the next stage within the priority level arbitrator 8 for further comparison and selection. In the situation that neither of the interrupt signals within a set is asserted, then the controller 16 passes no interrupt signal forward for further arbitration. In the case that only one of the interrupt signals is asserted, then the controller 16 serves to select this with the multiplexer 14 and pass this forward to the next stage within the priority level arbitrator 8. If both of the interrupt signals are asserted, then the controller 16 is responsive to the selection data stored within the selection data latch 18 to select to be passed forward for further processing the interrupt signal which was previously identified by the priority level comparator 12 as having the highest priority level of the two interrupts concerned. If the interrupts share the same priority level, then the interrupt having the lowest interrupt number may, by convention, be identified by the priority level comparator 12 as the interrupt signal to be passed forward for further processing if both are concurrently asserted. If, in another example embodiment, the set contained more than two interrupts concurrently asserted, then the highest priority interrupt of those asserted would be selected in accordance with the predetermined selection data.

The action of the interrupt selectors (14, 16, 18) under control of the selection data determined in advance by the priority level comparator 12 is that the correct selection between concurrently asserted interrupt signals may be made within the first stage of the priority level arbitrator 8 without having to include within the priority level arbitrator 8 multiple instances of circuitry able to compare the potentially multi-bit priority level values in real time. This results in reduced hardware overhead/complexity. In practice, the priority levels are relatively infrequently changed and so the selection data is relatively static such that the need to, for example, suspend interrupt processing while the selection data is updated will be infrequent.

The selection data in the example of FIG. 2 may comprise a single bit for each of the interrupt selectors (14, 16, 18) indicating which one of the two interrupt signals within the set of interrupt signals for that interrupt selector has the highest priority and should be selected if both of the interrupt signals are concurrently asserted.

The subsequent stages within the priority level arbitrator 8 serve to both compare the priority levels of interrupt signals passed to them and to select therebetween in dependence upon which of the interrupt signals has the associated highest priority level. The subsequent stages thus may, for example, include circuitry which subtracts one priority level from another priority level and then identifies the sign of the result to determine which of the priority levels is higher. As the need to provide such circuitry for comparing priority levels within the first stage of the priority level arbitrator 8 has been avoided, the overall hardware overhead associated with the priority level arbitrator 8 is reduced. It will be appreciated that as the first stage in the priority level arbitrator 8 has to perform a larger number of potential selections, then if there were a requirement for it to compare in real time the priority level values, then the associated hardware overhead for such comparisons would be higher than that associated with the subsequent stages within the priority level arbitrator 8.

Figure 3:
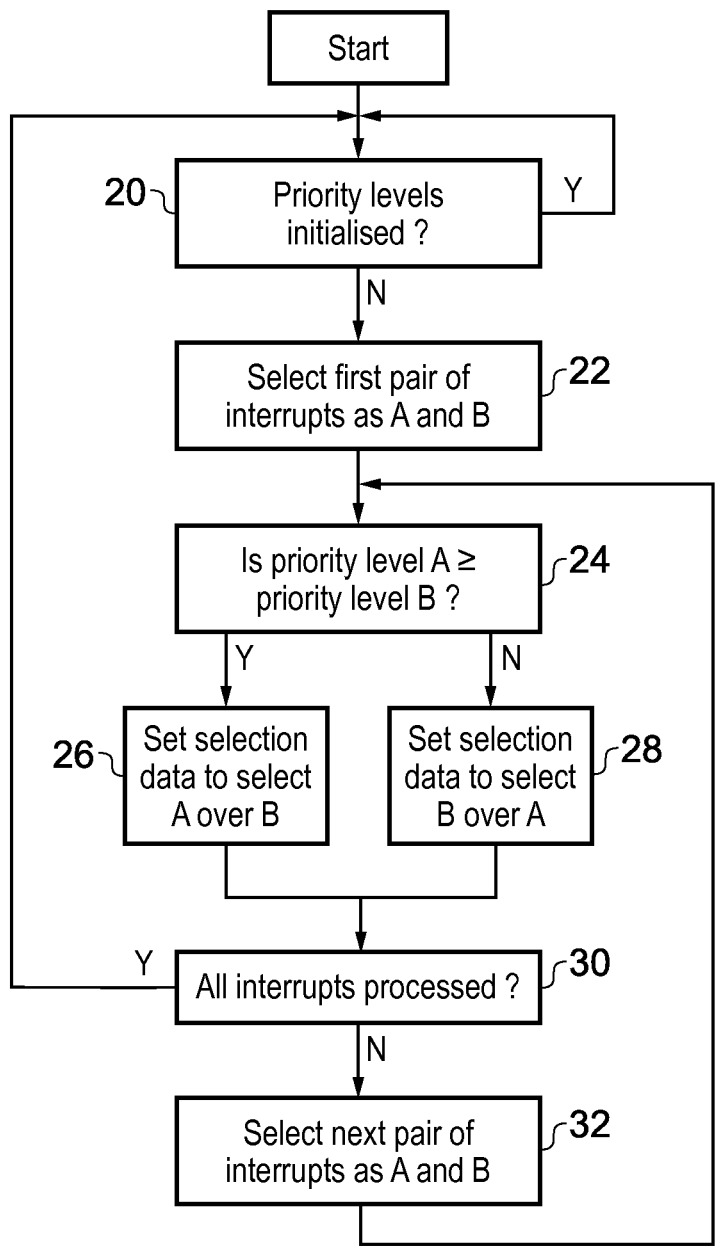
FIG. 3 is a flow diagram schematically illustrating selection data initialization.

FIG. 3 is a flow diagram schematically illustrating the operation of the priority level comparator 12 in forming the selection data upon initialization of the system. At step 20 the system determines whether or not the priority levels have already been initialized. If the priority levels have not been initialized, then processing proceeds to step 22 and subsequent steps such that the appropriate selection data may be set up at the same time. At step 22 the first pair of interrupts is selected as instances A and B. Step 24 then determines whether the priority level of A is greater than or equal to the priority level of B. If the priority level of A is greater than or equal to the priority level of B, then step 26 serves to set the selection data to select the interrupt associated with A over that associated with B if both interrupts are concurrently asserted. If the determination at step 24 is that the priority level of A is not greater than or equal to the priority level of B, then step 28 serves to set the selection data such that the interrupt associated with B will be selected over the interrupt associated with A if both interrupts are concurrently asserted. Step 30 determines whether all the interrupts have yet been processed. If all the interrupts have been processed, then processing returns to step 20. If all the interrupts have not yet been processed, then step 32 serves to select the next pair of interrupts as candidates A and B and processing returns to step 24. In this way, the priority level comparator 12 serves to divide the interrupt signals into pairs of interrupt signals between which priority level value comparisons are made and corresponding values set for the selection data for controlling the selection between the pair of interrupt signals should they be concurrently asserted (e.g. the bit to be stored within the selection data latch 18 which will serve to steer the associated multiplexer 14 when both interrupts are concurrently asserted).

Figure 4:
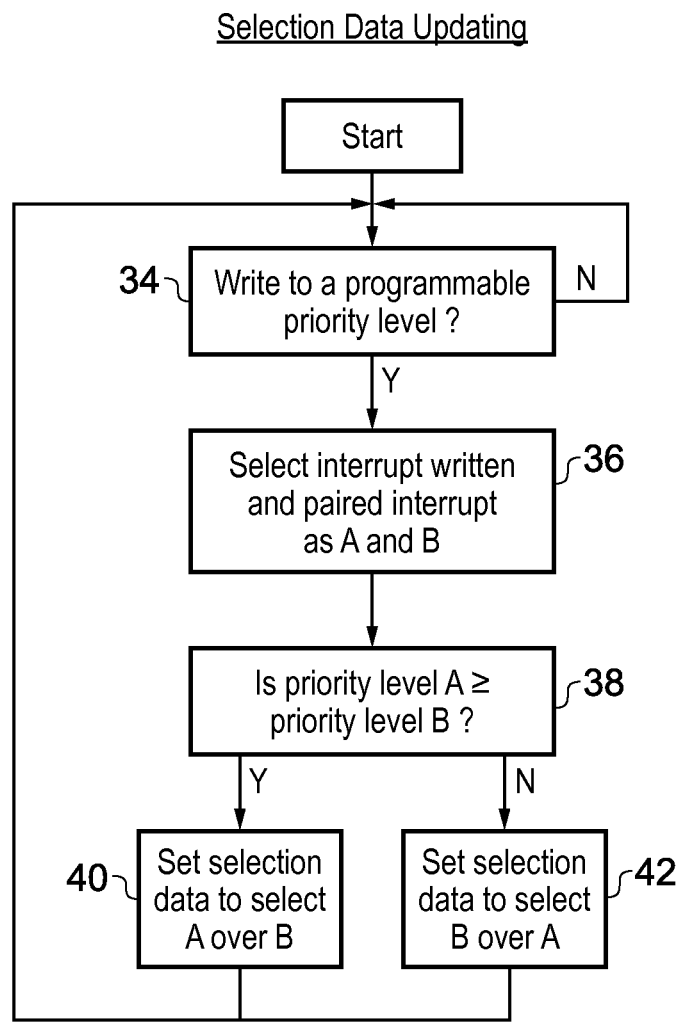
FIG. 4 is a flow diagram schematically illustrating selection data updating.

FIG. 4 schematically illustrates the action of the priority level comparator 12 when a programmable priority level value stored within the programmable priority level value store 10 is updated. Step 34 determines when such an update is made. Step 36 then serves to select as candidates A and B the interrupt for which the programmable priority level has just been updated together with the interrupt with which it is paired in forming one of the sets of interrupt signals. The interrupt signals may have associated interrupt numbers and such a pairing may be readily achieved, in some example embodiments, by identifying interrupt signals sharing common bits for their interrupt number other than the least significant bit. This example compares the priority of a pair of interrupts—it will be appreciated that the current techniques are not limited to a pair and may operate upon an arbitrary set of interrupts and upon groups of sets of interrupts.

Step 38 then determines if the priority level of candidate A is greater than or equal to the priority level of candidate B. If the priority level of candidate A is greater than or equal to the priority level of candidate B, then step 40 serves to set the selection data (bit) for that pair to indicate that the interrupt signal associated with candidate A should be selected over that associated with candidate B should both be concurrently asserted. Conversely, if the determination at step 38 is that the priority level associated with candidate A is not greater than or equal to the priority level associated candidate B, then step 42 serves to set the selection data (bit) such that it will control the multiplexer 14 for that pair of interrupts in a manner that the interrupt associated with candidate B will be selected over the interrupt associated with candidate A if both are concurrently asserted.

Figure 5:
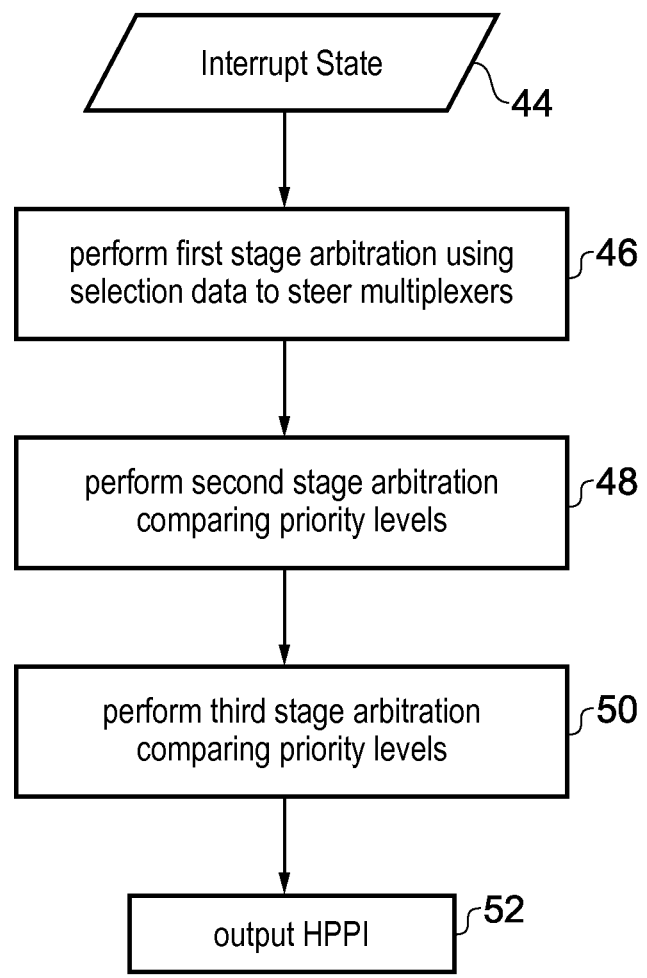
FIG. 5 is a diagram schematically illustrating the processing performed by the priority level arbitrator of FIG. 2.

FIG. 5 is a diagram schematically illustrating the operation of the multi-stage priority level arbitrator 8 of FIG. 2. At step 44 interrupt state is altered (e.g. at least one of the interrupt signal values input to the first stage of the priority level arbitrator 8 is altered. Step 46 then performs the first stage of arbitration using the selection data to steer the multiplexers 14 should multiple interrupt signals within any set be concurrently asserted. Step 48 represents the action of the second stage within the priority level arbitrator 8 in serving to compare priority levels for interrupt signals selected by the first stage and to pass one or more selected interrupt signals forward to the final third stage in the priority level arbitrator 8. Step 50 illustrates the action of the third stage in comparing the priority level values of the interrupts supplied to it as candidate pending interrupts and finally generating the output representing the highest priority pending interrupt at step 52.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
   an interrupt signal receiver configured to receive a plurality of interrupt signals having respective priority levels; and
   a priority level arbitrator coupled to said interrupt signal receiver and configured to identify an interrupt signal having a highest priority level among interrupt signals concurrently asserted at a given time; wherein
   said priority level arbitrator comprises:
      (i) a priority level comparator configured to generate selection data by comparing priority levels within each of a plurality of sets of interrupt signals from within said plurality of interrupt signals, said selection data representing an intra-set priority level ordering of said interrupt signals within each of said plurality of sets determined independently of assertion of any of said plurality of interrupt signals;
      (ii) a plurality of interrupt selectors, each of said plurality of interrupt selectors having a corresponding set within said plurality of sets and programmed with a corresponding portion of said selection data to select from among any concurrently asserted interrupt signals within said corresponding set an interrupt signal having a highest priority among said concurrently asserted interrupt signals within said corresponding set.

2. Apparatus as claimed in claim 1, wherein each of said plurality of sets comprises two interrupt signals.

3. Apparatus as claimed in claim 2, wherein said corresponding portion of said selection data represents which of said two interrupt signals within said corresponding set has a higher priority level.

4. Apparatus as claimed in claim 1, wherein each of said plurality of interrupt selectors comprises a multiplexer steered by said corresponding portion of said selection data.

5. Apparatus as claimed in claim 1, wherein said priority level comparator is configured to update at least a portion of said selection data when any of said priority levels of said plurality of interrupt signals are changed.

6. Apparatus as claimed in claim 1, wherein said priority levels are programmable.

7. Apparatus as claimed in claim 1, wherein said plurality of sets are disjoint sets.

8. Apparatus as claimed in claim 1, wherein said priority level arbitrator has a multi-stage structure with each stage connected in series with at least one adjacent stage and selecting between concurrently asserted interrupt signals until a final stage identifies said asserted interrupt signal having said highest priority level among interrupt signals concurrently asserted at said given time.

9. Apparatus as claimed in claim 8, wherein said priority level comparator and said plurality of interrupt selectors form a first stage within said multi-stage structure and subsequent stages dynamically compare priority levels of asserted interrupt signals between which a selection is to be made.

10. Apparatus as claimed in claim 1, wherein said interrupt signal receiver and said priority level arbitrator are part of an interrupt controller.

11. Apparatus for processing data comprising:
    interrupt signal receiving means for receiving a plurality of interrupt signals having respective priority levels; and
    priority level arbitrating means, coupled to said interrupt signal receiving means, for identifying an interrupt signal having a highest priority level among interrupt signals concurrently asserted at a given time; wherein
    said priority level arbitrating means comprises:
       (i) priority level comparing means for generating selection data by comparing priority levels within each of a plurality of sets of interrupt signals from within said plurality of interrupt signals, said selection data representing an intra-set priority level ordering of said interrupt signals within each of said plurality of sets determined independently of assertion of any of said plurality of interrupt signals;
       (ii) a plurality of interrupt selecting means for selecting an asserted interrupt, each of said plurality of interrupt selecting means having a corresponding set within said plurality of sets and programmed with a corresponding portion of said selection data to select from among any concurrently asserted interrupt signals within said corresponding set an interrupt signal having a highest priority among said concurrently asserted interrupt signals within said corresponding set.

12. A method identifying an interrupt signal having a highest priority level among a plurality of interrupt signals, said method comprising the steps of:
    generating selection data by comparing priority levels within each of a plurality of sets of interrupt signals from within said plurality of interrupt signals, said selection data representing an intra-set priority level ordering of said interrupt signals within each of said plurality of sets determined independently of assertion of any of said plurality of interrupt signals; and
    performing a plurality of selections, each of said plurality of selections having a corresponding set within said plurality of sets and programmed with a corresponding portion of said selection data generated in said generating step so as to select from among any concurrently asserted interrupt signals within said corresponding set an interrupt signal having a highest priority among said concurrently asserted interrupt signals within said corresponding set.

* * * * *